Figure 1:
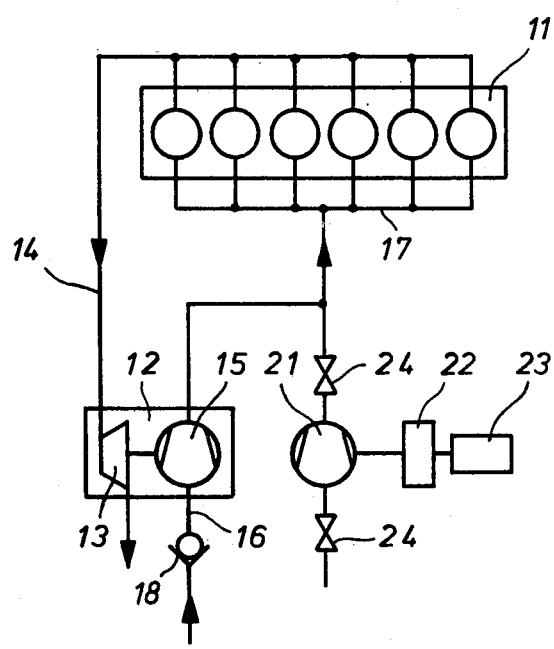

United States Patent [19]

Dinger

[11] 4,453,381
[45] Jun. 12, 1984

[54] INTERNAL COMBUSTION ENGINE WITH AN EXHAUST GAS TURBOCHARGER

[75] Inventor: Hans Dinger, Friedrichshafen, Fed. Rep. of Germany

[73] Assignee: MTU Motoren- und Turbinen-Union Friedrichshafen GmbH, Friedrichshafen, Fed. Rep. of Germany

[21] Appl. No.: 337,370

[22] Filed: Jan. 6, 1982

[30] Foreign Application Priority Data

Jan. 13, 1981 [DE] Fed. Rep. of Germany ....... 3100732

[51] Int. Cl.³ .......................................... F02B 37/00
[52] U.S. Cl. .................................................. 60/612
[58] Field of Search .................... 60/609, 610, 612; 123/564, 565

[56] References Cited

U.S. PATENT DOCUMENTS

| 2,233,319 | 2/1941 | Lozivit | 123/564 |
| 2,841,129 | 7/1958 | Reggio | 123/564 |
| 3,921,403 | 11/1975 | McInerney | 60/609 |
| 4,232,521 | 11/1980 | Mallofre | 60/612 |

FOREIGN PATENT DOCUMENTS

| 55-5482 | 1/1980 | Japan | 60/612 |
| 267149 | 8/1927 | United Kingdom | 60/612 |
| 308585 | 10/1930 | United Kingdom | 60/612 |
| 1181488 | 2/1970 | United Kingdom | 60/612 |

*Primary Examiner*—Douglas Hart
*Attorney, Agent, or Firm*—Craig & Burns

[57] ABSTRACT

In the operation of supercharged internal combustion engines, certain operating conditions exist during which the exhaust gas turbochargers cannot supply adequate supercharging air for the internal combustion engine due to a low production of exhaust gas by the engine. To eliminate this problem, an auxiliary compressor with a flywheel is proposed, which is constantly driven by an auxiliary drive mechanism and whose power input can be considerably reduced by closing its air conduit. In case of lacking charging air, the auxiliary compressor is used in a simple way, by opening the closure devices on its air side, in order to enable a supply of supercharging air to the internal combustion engine. The power required for driving the auxiliary compressor is derived primarily from energy stored in the revolving flywheel mass as well as from the power of the auxiliary drive mechanism.

3 Claims, 2 Drawing Figures

INTERNAL COMBUSTION ENGINE WITH AN EXHAUST GAS TURBOCHARGER

The present invention relates to an internal combustion engine and, more particularly, to an internal combustion engine with charging air compressors driven by exhaust gas turbine, in the air lines of which are arranged automatic valves which permit an air flow only from the compressor in the direction to the internal combustion engine, with at least one additional auxiliary compressor, driven by an auxiliary drive mechanism, which compressor, in case of a lack of sufficient exhaust gas energy, takes over the supply of the internal combustion engine with charging air.

An internal combustion engine of the aforementioned type is disclosed in the German Auslegeschrift No. 11 02 479 in which the required pressure and necessary amount of supercharging air are produced with the aid of an electrically driven auxiliary compressor during start-up and acceleration of the internal combustion engine or, in the case of a suddenly occurring strong load, that is, in all instances when the exhaust gas turbochargers cannot either be operated or can be operated only inadequately due to a lacking production of exhaust gases. The automatic valves in the air lines of the exhaust gas turbochargers prevent thereby an escape of supercharging air supplied by the auxiliary supercharger.

It is thereby disadvantageous that the auxiliary compressor which must have an input power corresponding to the exhaust gas turbines, also requires a driving motor designed for this purpose and an energy source for supplying the driving motor. In addition to high initial investment costs, this prior art construction necessitates large space requirements and involves a substantial additional weight. Additionally, the auxiliary compressor must first be brought at least approximately to its rated rotational speed in case of need before it can produce the necessary supercharging air pressure and the necessary quantity of supercharging air.

The time required for this purpose prolongs again the accelerating time of the internal combustion engine.

It is the object of the present invention to avoid the aforementioned disadvantages of the prior art.

The underlying problems are solved according to the present invention in that the auxiliary compressor is securely connected with an additional flywheel mass, is driven continuously by the auxiliary drive during the operation of the internal combustion engine, is adapted to be closed off on the air side for reducing its driving power and is used, in case of need, for supplying air to the internal combustion engine by opening the closure mechanisms on the air side thereof.

As a result of these measures, additional charging air is made available to the internal combustion engine during the operation with inadequate exhaust gas energy and therewith lacking charging air production of the exhaust gas turbochargers, whereby the pressure and quantity of the additional charging air depends in the first instance from the energy stored in the rotating flywheel mass and in the second instance from the magnitude of the output of the auxiliary drive.

The auxiliary charging sets in fully immediately with the opening of the air closure devices. No complicated and costly mechanical and control elements prone to troubles are necessary for the engagement and disengagement of the auxiliary compressor. The power for the auxiliary drive can be kept small because sufficient time is available between the individual instances of need for the renewed acceleration of the flywheel mass. As a result thereof, the costs and size for the driving motor of the auxiliary drive, for its energy source and possibly for its energy storage device can be kept within acceptable limits. By reason of the high rotational speeds for which compressors are designed as a rule, a small flywheel mass is adequate in order to store the required energy. This flywheel mass may be represented, for example, in a simple manner by an increase of the thickness of the rotor disk of the compressor.

For avoiding pressure losses when conducting additional charging air through the compressor rotor blades of the exhaust gas turbochargers, it is appropriate if the charging air supplied by the auxiliary compressor is fed into the charging air line on the pressure side of the exhaust gas turbocharger.

During the occurrence of unstable conditions (pumping operation of the compressor), however, it may be necessary that the charging air supplied by the auxiliary compressor is fed into the suction line of the exhaust gas turbochargers.

A compressor with an additional flywheel mass, driven by the engine by way of a free-wheeling device is disclosed in the German Pat. No. 837,940. As a result thereof, with a decreasing engine rotational speed, the compressor is uncoupled from the engine and is driven by the flywheel mass. However, neither during the starting operation nor during an acceleration operation after an idling period, the charging air conditions can be improved thereby. Additionally, the difficulties observed in connection with exhaust gas turbochargers do not occur with an engine-driven compressor. However, other difficulties such as, for example, charging air excess at high rotational speed and low output of the internal combustion engine with corresponding power input of the compressor, have to be accepted instead. Additionally, the use of a free-wheeling device with the high compressor rotational speeds is not without problems.

It is additionally known from the German Offenlegungsschrift No. 28 40 375 and from the German Offenlegungsschrift No. 29 12 950 to couple in case of need to the exhaust gas turbocharger a flywheel which is brought to and kept at the required rotational speed with the aid of an external drive. By reason of the extraordinarily high rotational speeds, however, the safe and problem-free functioning of these elements is not assured. The bearing support of the exhaust gas turbochargers which, by reason of the high rotational speeds and thermal expansions, has to be constructed with large tolerance and therefore must be damped by the lubricating oil pressure, reacts to a change of the bearing forces in a very sensitive manner, as is connected with the coupling operation so that also for this reason one has to reckon with troubles.

Figure 2:
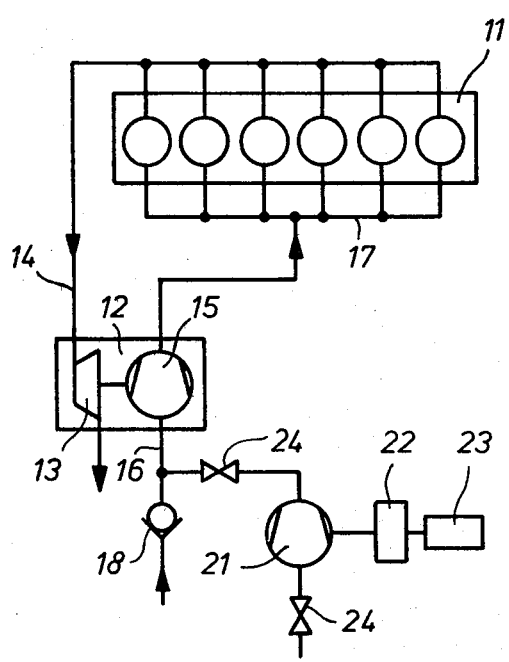

These and other objects, features, and advantages of the present invention will become more apparent from the following description when taken in connection with the accompanying drawings which show, for the purpose of illustration only, two embodiments in accordance with the present invention, and wherein:

FIG. 1 is a schematic view of an internal combustion engine equipped with an exhaust gas turbocharger constructed in accordance with the present invention with a feeding of auxiliary charging air on the pressure side of the exhaust gas turbocharger into the charging air line; and FIG. 2 is a schematic view of another embodiment of an internal combustion engine equipped with an exhaust gas turbocharger with a feeding of auxiliary charging air into the suction line of the exhaust gas turbocharger.

Referring now to the drawings wherein like reference numerals are used in both views to designate like parts and, more particularly, to FIG. 1, according to this figure, an internal combustion engine 11 is equipped with an exhaust gas turbocharger 12, whose turbine 13 is connected to the internal combustion engine 11 through an exhaust gas line 14. The exhaust gas turbocharger also includes a compressor 15 which sucks in charging air through a suction line 16 and supplies the charging air into a charging air manifold 17 of the internal combustion engine 11. An automatic valve 18 arranged in the suction line 16 of the compressor 15 permits an air flow only from the compressor 15 to the internal combustion engine 11.

An auxiliary compressor 21 is fixedly connected with an additional flywheel mass 22 and is driven by an auxiliary drive mechanism 23. The auxiliary drive mechanism 23 may, for example, be an electric motor, a compressed air motor, or a hydraulic motor whose power is supplied from a generator, compressor, or hydraulic pump driven by the internal combustion engine with an optional interposition of a storage means such as, for example, a battery, compressed air tank, or hydraulic reservoir. The auxiliary compressor 21 is adapted to be closed off on the air side by means of controllable valves 24.

As shown in FIG. 1, the auxiliary compressor 21 is connected with the charging air manifold 17 of the internal combustion engine. Alternatively, as shown in FIG. 2, the supercharging air delivered by the auxiliary compressor 21 may be fed, after opening the valves 24, into the intake line 16 of the exhaust gas turbocharger.

During normal operation of the internal combustion engine, the valves 24 are closed. The power input of the auxiliary compressor 21 is thereby strongly reduced and the auxiliary drive mechanism 23 is capable of accelerating the auxiliary compressor 21 together with the additional flywheel mass 22 up to a permissible rotational speed and of maintaining the rotational speed. The charging of the internal combustion engine takes place in a conventional manner by means of the exhaust gas turbocharger 12.

If the supercharging of the internal combustion engine 11 is no longer possible or no longer attainable to a sufficient extent due to a lack of a sufficient supply of exhaust gas, for example, during an accelerating operation of the engine or during a suddenly occurring load on the engine, then the auxiliary compressor 21 is engaged on in a simple manner by opening of the valves 24. The engagement of the auxiliary compressor 21 may be controlled, for example, in dependence on charging air pressure, rotational speed of the engine, and/or filling quantity of the engine.

At this point in time, the auxiliary compressor 21 temporarily supplies the necessary charging air for the internal combustion engine 11 supplements the charging air of the exhaust gas turbochargers 12. The power required for this purpose is withdrawn by the auxiliary compressor 21 from the energy stored in the flywheel mass 22 and from the drive power of the auxiliary drive mechanism 23.

The internal combustion engine 11 is able to combust a greater quantity of fuel with the aid of the additional air and is able to increase its rotational speed and power in a minimum amount of time until the exhaust gas quantity produced thereby is again sufficient to prepare the charging air by means of the exhaust gas turbocharger 12. At this point, the supplemental compressor 21 is cut off by closing its associated air lines and the rotational speed of the auxiliary compressor 21, reduced by the energy removal, is thereafter increased again by means of the auxiliary drive.

The flywheel mass 22, the auxiliary drive mechanism 23, and auxiliary compressor 21 must be so designed and constructed that the time available up to the next acceleration or load occurrence is sufficient to accelerate the compressor 21 plus the flywheel mass 22 to the required rated rotational speed.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein but intend to cover all such modifications as are encompassed by the scope of the appended claims.

I claim:

1. An internal combustion engine comprising exhaust gas turbocharger means including charging air compressor means driven by exhaust gas turbine means, air lines for said compressor means which include automatic valve means operable to enable an air flow only from the compressor means in the direction toward the internal combustion engine, at least one auxiliary compressor means driven by an auxiliary drive means, said auxiliary compressor means being operable to take over the supply of the internal combustion engine with charging air in case of inadequate exhaust gas energy of the internal combustion engine, characterized in that the auxiliary compressor means is securely connected with an additional flywheel means, is driven continuously by the auxiliary drive means during operation of the internal combustion engine, is operable to be closed off on its air-side by a closure means for reducing the driving power thereof and is operable to be engaged in case of need to supply charging air to the internal combustion engine by opening said closure means.

2. An internal combustion engine with a charging air line according to claim 1, characterized in that the charging air supplied by the auxiliary compressor means is fed to the charging air line on the pressure side of the exhaust gas turbocharger means.

3. An internal combustion engine with a suction line for the exhaust gas turbocharger means according to claim 1, characterized in that the air supplied by the auxiliary compressor means is fed into said suction line.

* * * * *